United States Patent
Gupta et al.

(10) Patent No.: US 7,184,445 B2
(45) Date of Patent: Feb. 27, 2007

(54) ARCHITECTURE AND API FOR OF TRANSPORT AND UPPER LAYER PROTOCOL PROCESSING ACCELERATION

(75) Inventors: Somesh Gupta, San Jose, CA (US); Boris Zemlyak, San Jose, CA (US); Tom Herbert, San Jose, CA (US)

(73) Assignee: Silverback Systems Inc., Campbell, CA (US)

( * ) Notice: Subject to any disclaimer, the term of this patent is extended or adjusted under 35 U.S.C. 154(b) by 41 days.

(21) Appl. No.: 10/775,069

(22) Filed: Feb. 11, 2004

(65) Prior Publication Data

US 2004/0156393 A1    Aug. 12, 2004

Related U.S. Application Data

(60) Provisional application No. 60/446,558, filed on Feb. 12, 2003.

(51) Int. Cl.
*H04L 12/28* (2006.01)
*H04J 3/16* (2006.01)

(52) U.S. Cl. .................................. 370/420; 370/469

(58) Field of Classification Search ............... None
See application file for complete search history.

(56) References Cited

U.S. PATENT DOCUMENTS

| | | | |
|---|---|---|---|
| 5,276,863 A * | 1/1994 | Heider ....................... 709/222 |
| 5,717,691 A | 2/1998 | Dighe et al. | |
| 5,948,069 A * | 9/1999 | Kitai et al. ............... 709/240 |
| 6,009,463 A * | 12/1999 | Brandt et al. ............ 709/213 |
| 6,018,530 A | 1/2000 | Chakravorty | |
| 6,141,705 A * | 10/2000 | Anand et al. ............ 710/15 |
| 6,273,622 B1 | 8/2001 | Ben-David | |
| 6,427,171 B1 * | 7/2002 | Craft et al. .............. 709/230 |
| 6,629,166 B1 * | 9/2003 | Grun ........................ 710/36 |
| 6,687,758 B2 * | 2/2004 | Craft et al. .............. 709/250 |
| 6,697,868 B2 * | 2/2004 | Craft et al. .............. 709/230 |
| 2002/0087729 A1 | 7/2002 | Edgar | |
| 2002/0107971 A1 * | 8/2002 | Bailey et al ............. 709/231 |
| 2002/0112085 A1 * | 8/2002 | Berg ....................... 709/250 |
| 2002/0156927 A1 | 10/2002 | Boucher et al. | |
| 2003/0046330 A1 | 3/2003 | Hayes | |
| 2003/0158906 A1 | 8/2003 | Hayes | |
| 2003/0200315 A1 * | 10/2003 | Goldenberg et al. ...... 709/225 |
| 2004/0015591 A1 * | 1/2004 | Wang ....................... 709/228 |
| 2004/0073716 A1 * | 4/2004 | Boom et al. ............. 709/250 |

OTHER PUBLICATIONS

Newton, Harry, Newton's Telecom Dictionary, Mar. 2004, CMP Books, 20th ed., p. 658.*

* cited by examiner

*Primary Examiner*—Chau Nguyen
*Assistant Examiner*—Cynthia L. Davis
(74) *Attorney, Agent, or Firm*—Sughrue Mion, PLLC (57) ABSTRACT

A network interface card comprising an upper layer protocol (ULP) handler, a TCP handler capable of interfacing with said ULP handler and, a link handler. The network interface card is adapted to take over and perform at least one session layer function of a host computer connected to a network.

68 Claims, 12 Drawing Sheets

CONNECTION_TRANSFER_IN
    This command is sent in order to transfer a connection acceleration (processing) into the L5NIC. This command contains all necessary information required to start a new or continue processing of an existing connection. The data associated with this command, in a case of TCP/IP connection, may include, but is not limited to: Connection 4tuple, Initial sequence number, unacknowledged sequence number, acknowledgement sequence number, current sent TimeStamp, current received (echo) timestamp, remote/local negotiated window scale values, and others. A unique identifier for connection reference is used, recognizable by the L5NIC and by a host. This command may be sent before the connection is actually initialized and then the connection is fully offloaded, i.e,. even SYN exchange for establishing a TCP connection will be executed on the L5NIC.

CONNECTION_TRANSFER_OUT
    Used when it is necessary to transfers a connection out of the L5NIC. The only required data in this message is the connection reference.

CONNECTION_DISCONNECT
    A command used in order to gracefully close (FIN exchange) an offloaded (accelerated) connection. The only required data in this message is the connection reference.

CONNECTION_ABORT
    Used in order to abort an offloaded (accelerated) connection. The only required data in this message is the connection reference.

CONNECTION_SHUTDOWN_TX
    This command is used in order to gracefully close the write side of a connection (send FIN). The only required data in this message is the connection reference.

CONNECTION_SEND
    Used for the purpose of transmitting data over a connection. The data associated with this command, in a case of TCP/IP connection, may include, but is not limited to: connection reference, list of buffers in the host memory and their length. These buffers contain data to be transferred over the connection.

FIGURE 10 A

CONNECTION_RECEIVE
  Used to request data reception from a connection into connection specific receive buffers in a host memory. The data associated with this command, in a case of TCP/IP connection may include, but is not limited to: connection reference, list of connection specific buffers in the host memory and their length. These buffers will be filled by the L5NIC with data received over the connection.

CONNECTION_MANAGE
  This command is used in order to change certain connection parameters. The data associated with this command, in a case of TCP/IP connection may include, but is not limited to: connection reference, receive window size to advertise, routing related information, disable/enable nagle algorithm.

CONNECTION_QUERY
  A request sent in order to query certain connection parameters. The data associated with this command, in a case of TCP/IP connection, may include, but is not limited to: connection reference, parameters to be reported.

CONNECTION_QUERY_REPLY
  A response from a L5NIC with data requested by the corresponding CONNECTION_QUERY request. The data associated with this reply may include, but is not limited to: connection reference, reported parameters.

CONNECTION_SYNC
  A request sent in order to synchronize with a connection. This is an auxiliary message used to flush existing message pipes between a host and a L5NIC. The data associated with this command, in a case of TCP/IP connection, may include, but is not limited to: connection reference.

CONNECTION_SYNC_REPLY
  Acknowledges reception and processing of the corresponding CONNECTION_SYNC. The data associated with this reply may include, but is not limited to: connection reference.

CONNECTION_SEND_NOTIFY
  A L5NIC acknowledgement of successful transfer of a certain amount of data of an offloaded TCP connection. The data associated with this notification may include, but is not limited to: connection reference, amount of data successfully transferred over the connection (acknowledged by the remote connection peer). Host may use this notification to free the data respective of the connection and queued by the application.

FIGURE 10 B

CONNECTION_RECIEVE_NOTIFY
   Accelerator notifies reception of additional data on the connection into anonymous or connection specific host buffers. The data associated with this notify maybe, but not limited to: connection reference, some buffer identification and amount of data posted into the buffer.

LINK_LAYER_RECEIVE_NOTIFY
   L5NIC notification of reception of additional Layer 2 into host buffers. The data associated with this notification may include, but is not limited to: buffer identification, amount of data posted into the buffer.

CONNECTION_NOTIFY
   L5NIC notifies host of a change in a connection state. The data associated with this notification may include, but is not limited to: connection reference, notification type (connection is ESTABLISHED, disconnected, timed-out, or gracefully closed), connection state, etc.

CONNECTION_ROUTE_NEEDED_NOTIFY
   L5NIC notifies host when a new route is needed for the connection. The data associated with this notification may include, but is not limited to: connection reference.

ASYNC_BUFFERS
   A command sent in order to post anonymous receive buffers to the L5NIC. These buffers are used for the received TCP data or Layer 2 data, which is not a data directly associated with the offloaded connections (i.e., all TCP traffic associated with the offloaded connections is processed on the L5NIC). The data associated with this command, in a case of TCP/IP connection, may include, but is not limited to: list of buffers in Host memory, buffer lengths.

LINK_LAYER_SEND
   A request sent in order to send Link Layer packet via one of the L5NICs. The data associated with this command, in a case of TCP/IP connection, may include, but is not limited to: packet length, list of buffers in a host memory with the data, which comprises the packet and buffer length.

LINK_LAYER_SEND_NOTIFY
   L5NIC acknowledges successful transfer of certain number of Link Layer packets. The data associated with this notification may include, but is not limited to: number of transmitted packets. Host may use this notification to free the data associated with the transmitted packets.

FIGURE 10 C

SET_PARAMETERS
    A command sent in order to update global (non-connection specific) TCP/IP parameter of the TCP/IP stack in the L5NIC. The data associated with this command, in a case of TCP/IP connection, may include, but is not limited to: list of parameters to change.

GET_PARAMETERS
    This message is sent in order to receive a value of the global non-connection specific TCP/IP parameter from the TCP/IP stack in the L5NIC. The data associated with this command in a case of TCP/IP connection maybe, but not limited to: list of parameters to report.

GET_PARAMETERS_REPLY
    L5NIC sends this message in order to respond to the host values requested in a respective GET_PARAMETERS request. The data associated with this response may include, but is not limited to: set of reported values.

GET_STATISTICS
    A message sent in order to receive Link Layer, TCP/IP and additional statistics from the TCP/IP stack of the L5NIC.

GET_STATISTICS_REPLY
    L5NIC sends this message in response to a respective host GET_STATISTICS request. The data associated with this response may include, but is not limited to: set of reported statistic values.

RESET_STATISTICS
    A command sent in order to reset Link Layer, TCP/IP and additional statistics of the L5NIC based TCP/IP stack.

FIGURE 10 D

| Group | tl_ | FreeBSD | Function |
|---|---|---|---|
| Setup | tl_open | socket | Creates a transport layer socket |
| | tl_bind | bind | Binds a local address to a socket |
| Server | tl_listen | listen | Listen on a socket |
| | tl_accept | accept | Establish a connection received on a listener |
| | tl_confirm | n/a | ULP confirms the opening of a new connection |
| Client | tl_connect | connect | Starts a connection to the given peer's address |
| Input | n/a | read | |
| | tl_recv* | recv | Receives data on a connection |
| Output | n/a | write | |
| | tl_send* | send | Posts data to send over a connection |
| I/O | n/a | select | |
| Termination | tl_shutdown | shutdown | Shut down the connection |
| | tl_close | close | User request for graceful connection close |
| | tl_disconnect | n/a | User request to tear down the connection |
| | tl_abort | n/a | User request for a connection abort |
| Administration | tl_setsocketopt | setsocketopt | Management call to set attributes of the connection??? |
| | tl_getsocketopt | getsocketopt | Management call to query attributes of the connection |
| | tl_getsocketname | getsocketname | Get the local address bound to a connection |
| | tl_getpeername() | getpeername() | Get peer's address on a connection |
| | tl_transfer_in | n/a | Transfer's a connection into a L5NIC |
| | tl_transfer_out | n/a | Transfer's a connection out of a L5NIC |
| | tl_get_accelerators() | n/a | Get a list of L5NICs capable of handling a socket |
| | tl_setcbs() | n/a | User set callback routines for events from the TAP |
| | tl_sync | n/a | Synchronization of user application with socket state |
| Callbacks | tl_newconn_cb() | n/a | User callback for request for new connection setup |
| | tl_transferredout_cb() | n/a | Acknowledges completion of connection transfer out operation |
| | tl_connected_cb() | n/a | Called on completion of an active connection attempt |
| | tl_disconnected_cb() | n/a | Reports that a connection was asynchronously disconnected (moved to closed state) |
| | tl_notify_cb() | n/a | User callback for any exception on the connection |
| | tl_sync_cb() | n/a | Acknowledges completion of sync operation |

\* - TOE (TCP offload engine) only commands to support generic TCP

FIGURE 11

ARCHITECTURE AND API FOR OF TRANSPORT AND UPPER LAYER PROTOCOL PROCESSING ACCELERATION

This Application claims priority from co-pending U.S. Provisional Application Ser. No. 60/446,558 filed Feb. 12, 2003, the contents of which are incorporated herein by reference.

I. DESCRIPTION

A. Related Applications

B. Field

This disclosure teaches techniques generally related to the handling of transport and upper layer protocol connections by an intelligent network interface card (NIC). More specifically, the acceleration of NIC by restructuring the partitioning of the network layer model is also discussed.

II. BACKGROUND

Network communications often use a seven layer communication model developed by the International Standards Organization (ISO) and known as the Open Systems Interconnection (OSI) networking suite. The seven layers are physical (L1), logical or data link (L2), network (L3), transport (L4), session (L5), presentation (L6), and application (L7). Each layer performs certain functions. When all seven layers work together, data is brought to the application level if received from the network. Data from the application level is also sent down the model and transferred over the physical transportation media.

In the physical layer (L1), the physical properties of the various communications media, as well as the electrical properties and interpretation of the exchanged signals are handled. The logical layer (L2) handles the logical organization of data bits transmitted through a particular medium. The network layer (L3) describes how a series of exchanges over various data links can deliver data between any two nodes in a network, for example Internet protocol (IP). The transport layer (L4) handles the quality and nature of the data delivery, for example, transport control protocol. The session layer (L5) handles the organization of data sequences larger than the packets handled by lower layers. The presentation layer (L6) describes the syntax of data being transferred, and in the application layer (L7) the actual implementation of the application gets performed, for example, an implementation of a file transfer protocol (FTP).

Traditionally L1 and L2 were implemented in hardware and L3 through L7 in software, mostly in a host or a client. In addition to the seven-layer model, OSI also includes a set of protocols for handling data.

This model is now widely used as an operating model for transporting packetized data. While acceleration of the operations in a network are required, the inherent architecture of the network is maintained to enable easy configuration of products from a multitude of suppliers, all generally conforming to the standard.

Figure 1:
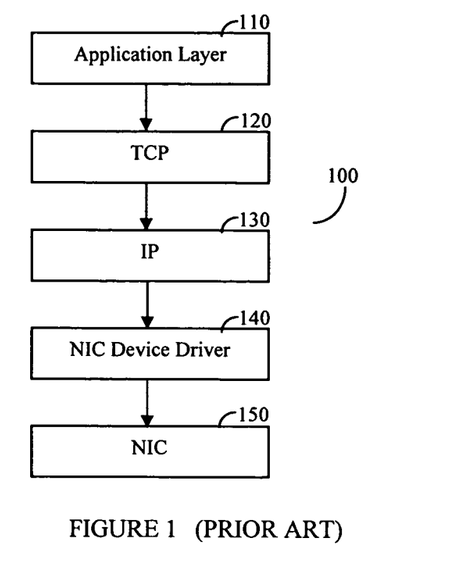
FIG. 1 is a diagram of the traditional layers of TCP based application processing (prior art).

A typical architecture of a network system is shown in FIG. 1. Architecture 100 comprises of an application 110, protocols 120 and 130 and drivers 140 implemented in software, usually on the host, and a network interface card (NIC) 150 which deals with at least layers 1 and 2. Therefore, in this implementation, layers 3 and above are implemented in software on the host. The need for acceleration of the operations involved in handling of data to be communicated over the network arises from the fact that networks provide significantly faster communication speeds (now approaching over 10 giga bits per second) as well as the volume of data to be transferred. Handling such a volume of data by a host is a daunting task requiring significant computing power not normally available to such hosts.

Solutions in the related art attempt to provide acceleration of the operations involved in handling data communication. These related art solutions generally take one of two routes. The first breaks from the standard OSI model and suggests other solutions to accelerate performance. Examples for such approaches are shown in U.S. Pat. No. 6,018,530 by Chakravorty and U.S. Pat. No. 6,273,622 by Ben-David.

The second approach attempts to accelerate certain portions of the protocols, for example, implementing a higher layer (for example L3 or L4), that were traditionally handled in software, in hardware. Examples of such approaches are shown in U.S. Pat. 5,717,691 by Dighe et al. and U.S. patent application Ser. No. 20020087729 by Edgar. However, none of the related art approaches teach architectures and methods for offloading transport protocols and upper layer protocol from the host software.

III. SUMMARY

It would be therefore advantageous to provide an architecture designed to be consistent with the seven layer model but providing for an accelerated performance of the transport protocol and upper layer protocols.

To realize the advantages, there is provided, a network interface card comprising an upper layer protocol (ULP) handler, a TCP handler capable of interfacing with said ULP handler and, a link handler. The network interface card is adapted to take over and perform at least one session layer function of a host computer connected to a network.

In a specific enhancement, the network interface card is a layer 5 network interface card in a network implementing an open systems interconnection (OSI) protocol.

In another specific enhancement, data from the network is received and processed by the network interface card.

In another specific enhancement said processing comprises taking over and performing at least one function of a physical layer, a data link layer, a network layer or a transport layer from the host computer.

More specifically, the ULP handler is adapted to communicate with a ULP driver of said host computer.

In yet another specific enhancement, the TCP handler is adapted to communicate with a transport accelerator driver of said host computer.

In still another specific enhancement, the TCP handler is adapted to communicate with the network.

In still another specific enhancement, the link handler is adapted to communicate with a link driver of said host computer.

In still another specific enhancement, the link handler is adapted to communicate with a network.

In still another specific enhancement, the network interface card further comprises at least one of a transport accelerator, embedded accelerator, portable stack, embedded link driver and embedded applications.

In still another specific enhancement, the network interface card is capable of receiving commands from an enhanced stack belonging to said host, said enhanced stack being further capable of supporting session layer acceleration.

More specifically, the commands between said enhanced stack and said network interface card are performed using acceleration primitives.

Even more specifically, said network interface card handles only a subset said acceleration primitives sent to said network interface card from a plurality of said acceleration primitives sent to a plurality of network interface card devices.

Even more specifically, at least one of said acceleration primitives is used to establish a direct connection between ULP of said host and said ULP handler.

Even more specifically, said direct connection enables at least one function associated with a TCP/IP layer to be processed on said network interface card.

Even more specifically, said direct connection comprises enables transferring data to said network interface card from said host and transferring data from said network interface card to said host.

Even more specifically, said transferring data to said network interface card includes at least one of a transfer in request, a success transfer in reply and a fail transfer in reply.

Even more specifically, said transferring data from said network interface card includes at least one of a transfer out request, a success transfer out reply and a fail transfer out reply.

Even more specifically said acceleration primitives are enabled by the use of an application programming interface (API) for interfacing between said host and said network interface card, said API being further comprised of a plurality of message primitives.

Figure 10:
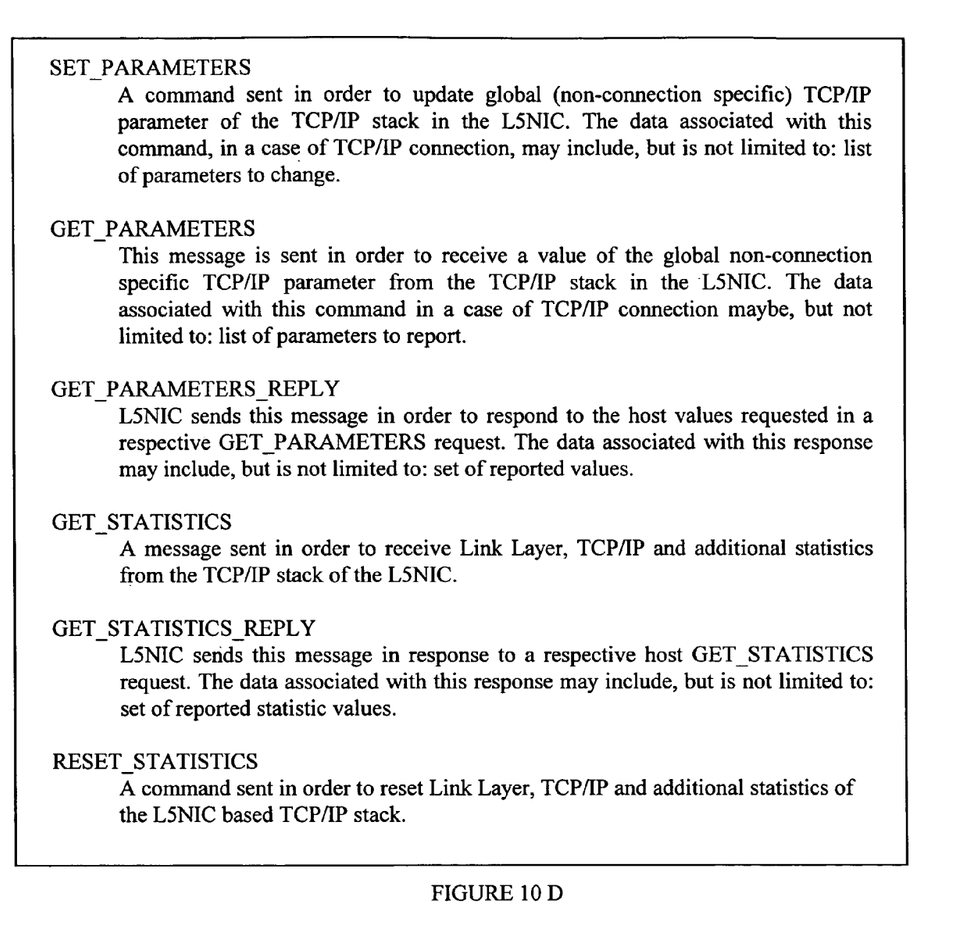

Another aspect of the disclosed teachings is an API for facilitating interfacing between a host computer and a network interface card, said API including some of the message primitives shown in FIG. 10.

Yet another aspect of the disclosed teachings is a method of acceleration of a network operation, said method comprising transferring a connection to a network interface card and taking over from a host computer attached to the network and performing at least one network function at the network interface card.

Still another aspect of the disclosed teachings is a method for acceleration of a session layer network operation, said method comprising sending a sequence of initialization commands from a ULP driver of a host to transport accelerator provider (TAP) of said host. A transfer message is sent from said TAP to a TCP handler of a network interface card (NIC). A synchronization command is sent from the NIC to a server over a network connecting said host computer and said server. A synchronization acknowledgement message is received by the NIC over said network from said server. An acknowledgment message is sent from the NIC to said server. A notification command is sent to a ULP handler of said NIC. A connection notification command is sent from the NIC to said TAP of said host. A connected information command is sent from the NIC to said ULP driver of said host.

IV. BRIEF DESCRIPTION OF THE DRAWINGS

The disclosed teachings will become more apparent by describing in detail examples and embodiments thereof with reference to the attached drawings in which:

FIG. 10 A–D is a description of messages between a host and the L5NIC.

FIG. 11 is a comparison between FreeBSD APIs and the "tl_" in accordance with aspects of the disclosed teachings.

V. DETAILED DESCRIPTION

Figure 2:
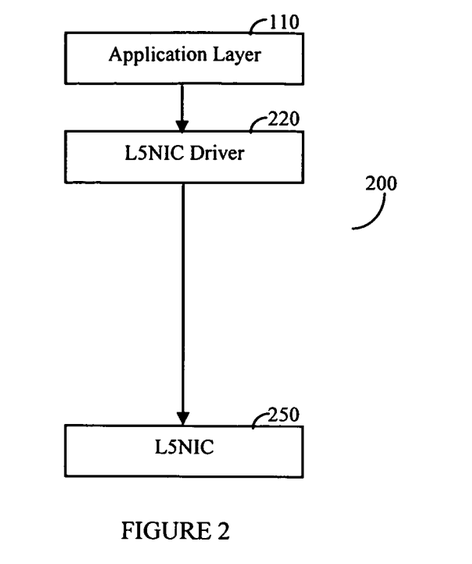
FIG. 2 is a diagram of an exemplary implementation of a host offloading of TCP based application processing.

Reference is now made to FIG. 2 where an exemplary implementation of an architecture for acceleration of upper level protocols (ULPs) is shown. In this exemplary implementation, acceleration of TCP/IP is achieved by providing layer 5 network interface card (L5NIC) drivers. These drivers are capable of handling requests directly from a ULP and operating in conjunction with a L5NIC. This implementation minimizes the amount of TCP/IP protocol processing performed by a host and allows the transfer of the raw data from the host to the L5NIC.

Corresponding functionality is also achieved in the opposite direction, i.e., when data is received from a network to be transferred to a host. This data can be processed and received by the L5NIC. Only when ready, this data is provided to the host. This relieves the host from the need to process the requests. ULPs optimized for acceleration may include, but are not limited to: iSCSI Target, iSCSI Initiator, CIF/NSF, RDMA, Generic TCP, etc.

Figure 3:
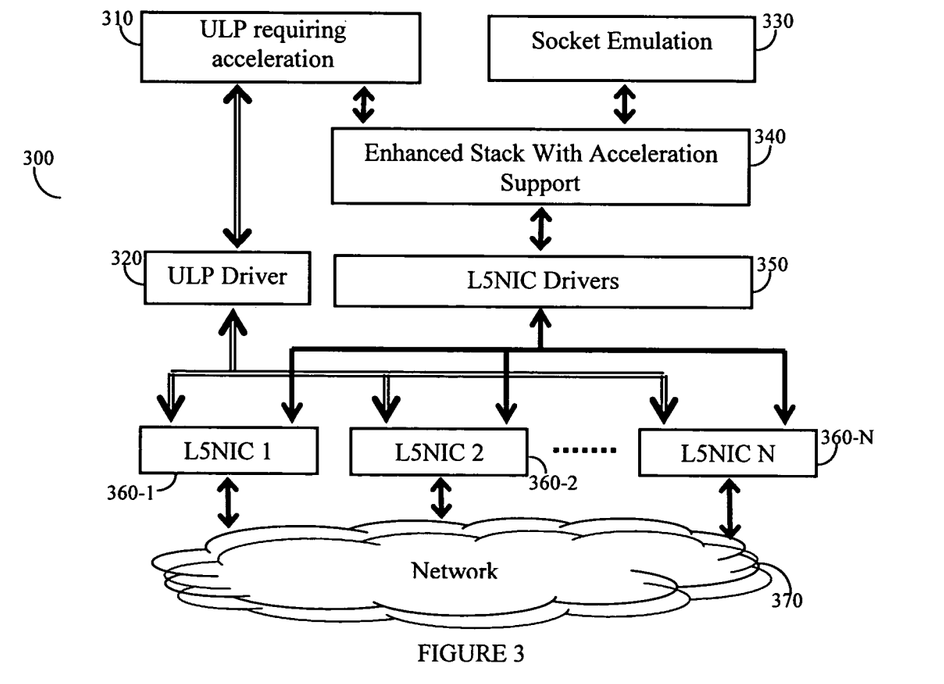
FIG. 3 is a diagram of an exemplary implementation of a TCP/ULP acceleration model embodying aspects of the disclosed teachings.

Referring now to FIG. 3, a detailed view of an exemplary implementation of an architecture embodying aspects of the disclosed teachings is provided. A ULP requiring acceleration 310 may provide a request to the enhanced stack supporting acceleration 340. The interface facilitating the receipt and implementation of such requests is described in more detail below.

In addition, FIG. 10A–D, describes in further detail the requests available in an implementation of the disclosed teachings. In FIG. 10, the messages exchanged in the system are described in detail. These messages are useful for offloading the establishment of a connection, processing associated with data transfer associated, and processing associated with connection tear down. The messages are of particular value when used in conjunction with the described L5NIC. The enhanced stack 340 communicates with the L5NIC drivers 350 through a set of generic acceleration primitives further detailed below.

The L5NIC drivers 350 communicate with a specific L5NIC 360 from a plurality of L5NICs, for example L5NIC 360-1 and assign it for the processing of the ULP request made by the ULP requiring acceleration 310. Once a connection is established, the ULP requiring acceleration 310 may communicate directly with the assigned L5NIC, for example L5NIC 360-1, and through ULP driver 320 maintain the connection and operate in an accelerated fashion. Standard applications can continue to operate using the standard model through socket emulation 330 that communicates with the enhanced stack 340. While L5NIC 360 are shown in this implementation to be hardware platforms it is possible to operate with a combination of one or more implementations of L5NIC that are software based.

Figure 4:
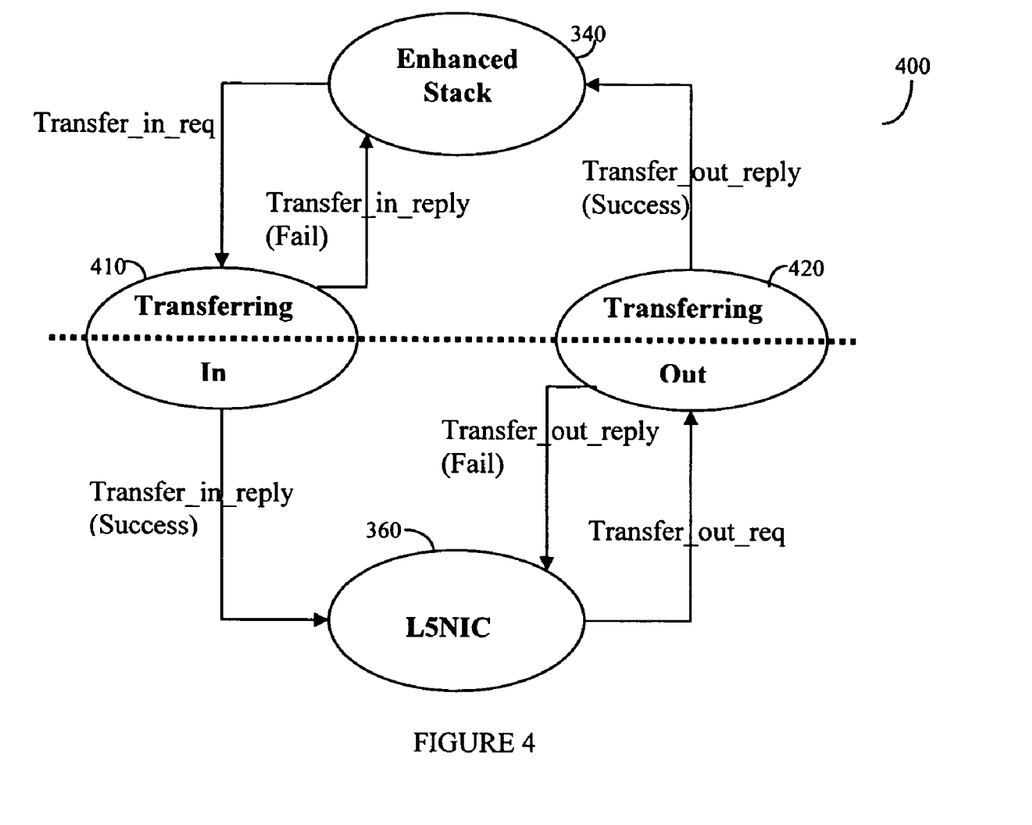
FIG. 4 is a diagram of the an exemplary implementation of a connection management for TCP/ULP acceleration model embodying aspects of the disclosed teachings.

Reference is now made to FIG. 4 where a schematic diagram of an exemplary implementation of the operation of the enhanced stack 340 with an L5NIC is shown. The diagram should be viewed as an operational diagram rather then a functional description of elements of the solution disclosed herein. It is the task of the enhanced stack 340 to support the transportability of a connection from one accelerator to another as well as the communication with the host.

Specifically, connections are created in the enhanced stack 340 and it controls all the inbound and outbound transfers. Enhanced stack 340 initiates a Transfer_In_Request which is responded to as described in 410. Such a request may either succeed or fail. In case of failure a "fail" message is relayed using Transfer_In_Reply. If the request succeeds, connection is transferred to L5NIC 360.

While in transfer the connection state is frozen. L5NIC 360, to which the connection has been transferred, is now capable of handling the connection. All dynamic context information is maintained by the L5NIC 360. Data will flow directly from the ULP handler (ULP FW) on the L5NIC 360 to the host handling the enhanced stack 340, as described in more detail below. A connection may be ceased by the host through enhanced stack 360 through the use of the Transfer_Out_request which is responded to, as described, in 420. In case of failure, a fail message using Transfer_Out_Reply is sent to L5NIC 360. Otherwise, if the Transfer_Out_Request is a "success," then the message is sent to the enhanced stack 340 and the connection is moved from the control of the L5NIC 360 back to the host. Detailed examples of establishing a connection, transferring of data, and closing a connection are discussed below.

Figure 5:
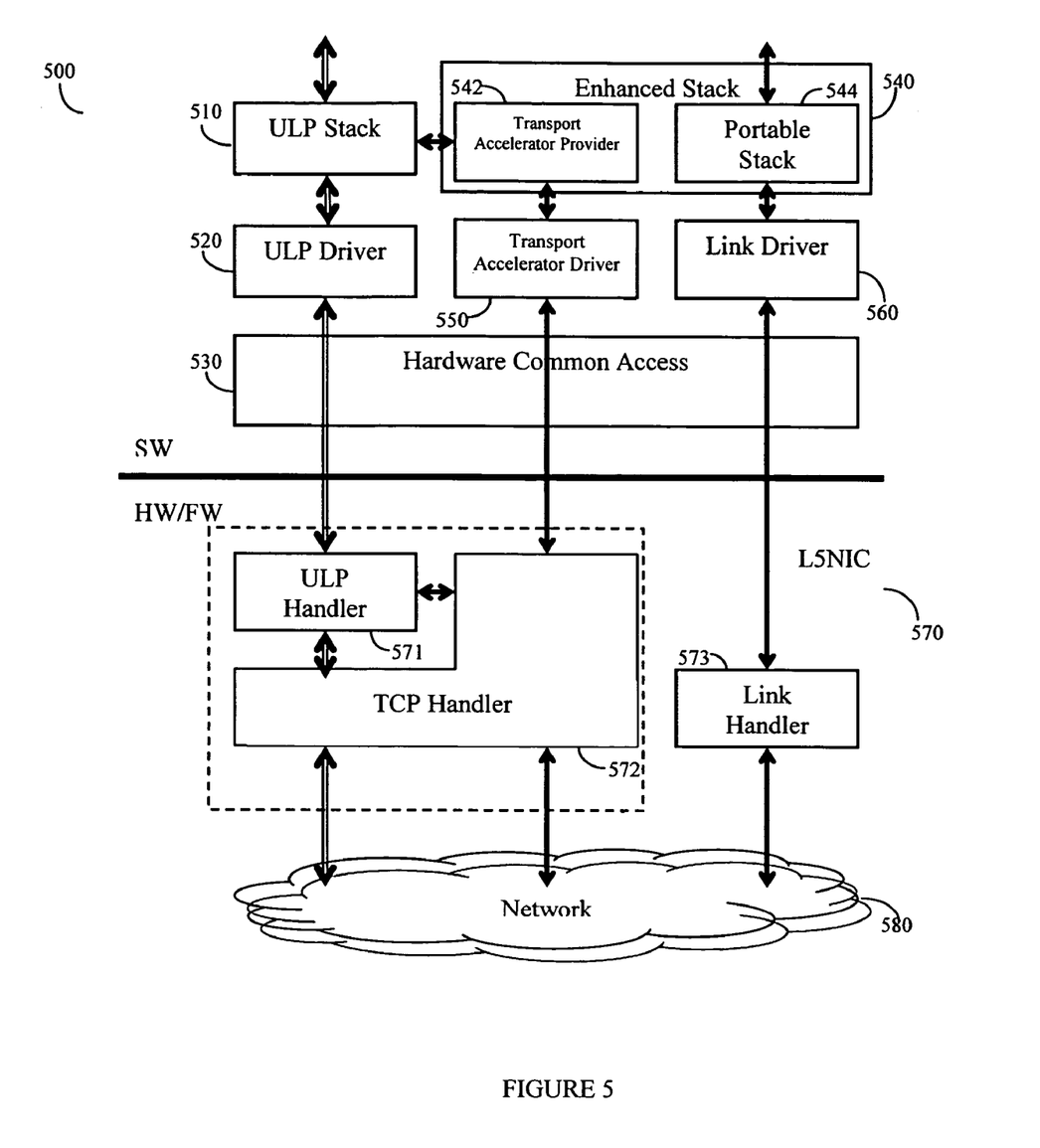
FIG. 5 is a diagram of an exemplary implementation of a host centric TCP/ULP acceleration model embodying aspects of the disclosed teachings.

FIG. 5 shows an exemplary implementation of a generic TCP/ULP acceleration model 500 that is host centric. In this implementation, components ULP stack 510, ULP driver 520, hardware common access 530, enhanced stack 540, transport accelerator 550 and link driver 560, are all implemented in software and are part of a host that is capable of communication with a L5NIC 570. This model can be expanded so that a host could communicate with a plurality of L5NICs.

L5NIC is further connected to the network 580. L5NIC 570 further comprises from a ULP handler 571, TCP handler 572 and link handler 573, capable of communicating with ULP driver 520, transport accelerator 550 and link driver 560 respectively. The TCP handler and the link handler are capable of communicating with a network. Each of the handler units 571, 572, and 573, may be implemented in firmware, hardware, or combination thereof. Connections are initiated by the host and the control of pushing and transferring connections in and out of the L5NIC 570 is part of the tasks assigned to the ULP stack 510.

The enhanced stack is comprised of a portable stack 544 and a transport accelerator provider 542. Portable stack 544 may be based, for example, on FreeBSD 4.5. The enhancements discussed in relation to the disclosed teachings pertain to the transport accelerator provider 542 and include a plurality of acceleration primitives described in more detail below.

The TCP handler and the link handler may be capable of communicating with a network. The L5NIC may comprise at least one of transport accelerator, embedded accelerator, portable stack, embedded link driver and embedded applications.

L5NIC 570 performs function normally related to layers 1 through 5 of the standard communication model like the OSI model. Layer 1 is the actual physical connection. Layer 2 is handled, at least in part, by link handler 573. Layers 3 and 4 are handled, at least in part, by TCP handler 572, and layer 5 is handled, at least in part, by ULP handler 571.

Figure 6:
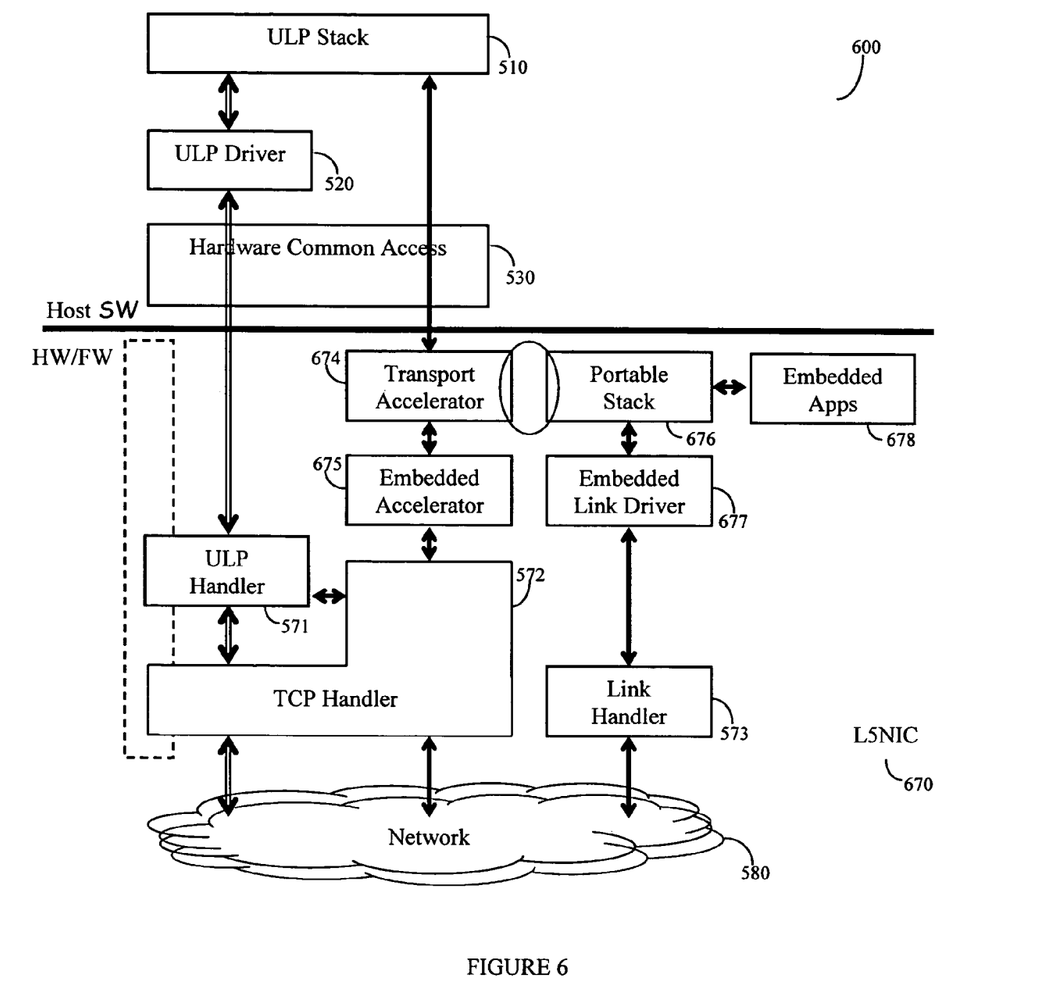
FIG. 6 is a diagram of an exemplary implementation of an embedded TCP/ULP acceleration model embodying aspects of the disclosed teachings.

Referring to FIG. 6 a model 600 using an embedded version of an L5NIC 670 is shown. In a system where the embedded version of L5NIC 670 is used, only the ULP stack 510, ULP driver 520 and the hardware common access 530 are used. All other functions previously handled in software by the host are now embedded as part of the L5NIC 670. Therefore the enhanced stack and the corresponding drivers are now embedded as part of L5NIC 670. The architecture 600 can be modified such that the host can operate without a stack at all. The management of the applications is done through the use of embedded applications 678.

Figure 7:
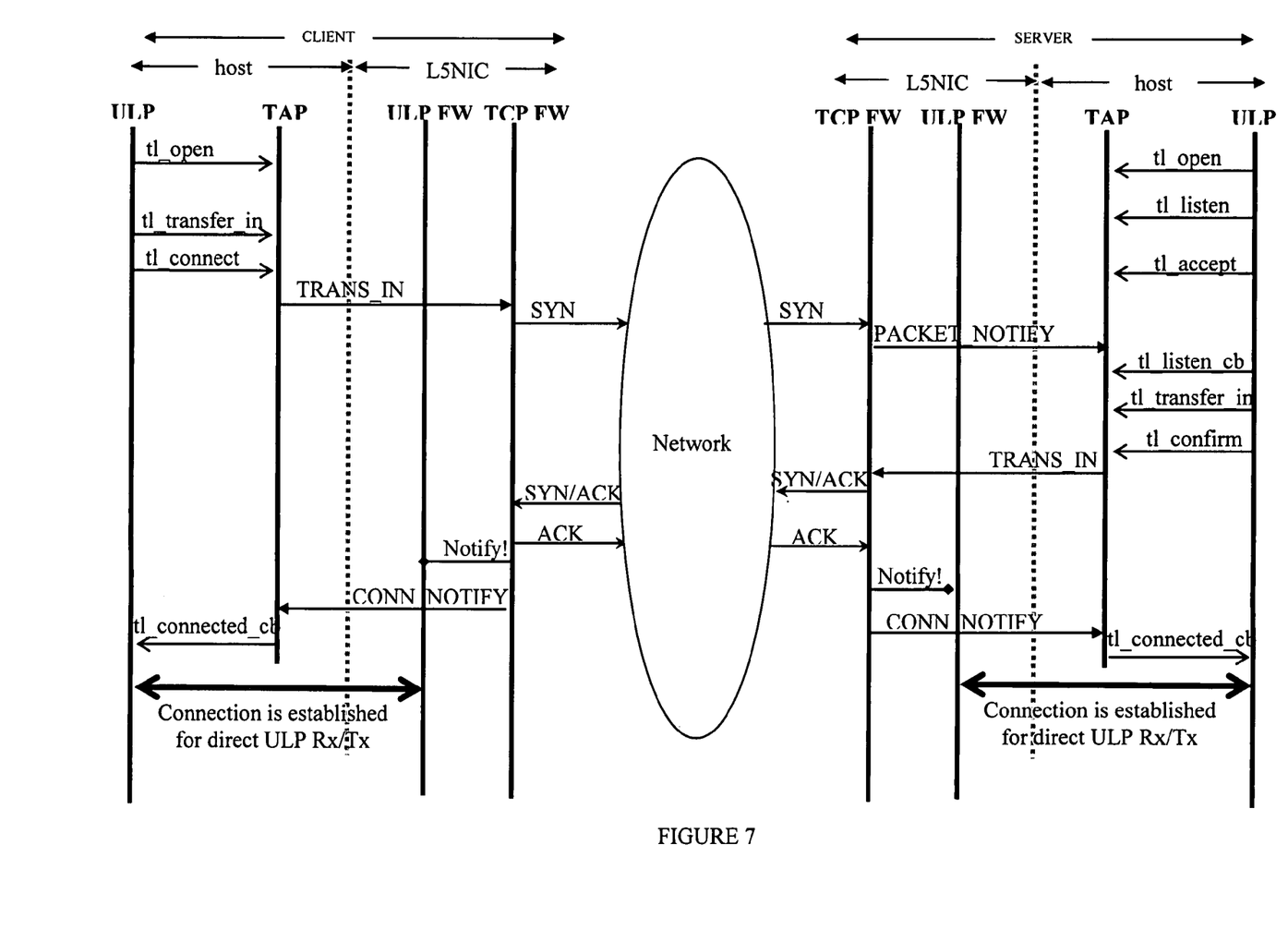
FIG. 7 is a diagram of an exemplary implementation of connection establishment embodying aspects of the disclosed teachings.

Reference is now made to FIG. 7 where a communication diagram is shown for the purpose of opening a connection between a client and a server using L5NICs on both the client and the server side of the network. The system could be implemented such that a L5NIC is present on either one of the respective sides. Both client and server begin the operation by sending a "tl_open" message for the purpose of opening a connection to the transport accelerator provider (TAP). A comparison between "tl_" constructs and FreeBSD is shown in FIG. 11. On the server side, "tl_open" is followed by sending "tl_listen" and "tl_accept" to TAP. At this stage the server is ready to handle requests to open a connection. On the client side, following "tl_open," the primitives "tl_transfer_in", telling the TAP to push the connection to a certain accelerator, and "tl_connect", telling the TAP to trigger a connection setup of a 3-way handshake, are sent to TAP. TAP responds with a "TRANS_IN" request to the TCP handler (TCP FW) and TCP FW responds with a "SYN" signal sent through the network to the TCP FW of L5NIC of the server side. The TCP FW sends a "PACKET_NOTIFY" to the TAP of the server to begin a new connection and in response, ULP of server responds with "tl_listen_cb", which is a call back that tells the ULP that there is a new request for a connection setup, "tl_transfer_in", which tells the TAP to push the connection on a specific L5NIC, and "tl_confirm", which causes the TAP to complete the connection setup handshake. After this process the server is ready to accept data from the connection. The server's TAP initiates a "TRANS_IN" and the TCP FW of the server's L5NIC responds with a SYN/ACK signal to the network directed at the requesting client.

The TCP FW upon receiving the SYN/ACK signal sends back, to the server, an ACK signal and causes a notify message to the ULP FW making it ready to open a direct ULP to ULP FW connection. In addition a "CONN_NOTIFY" message is sent from the TCP FW of the L5NIC of the client to the host TAP which in turn responds with a "tl_connected_cb" message to the ULP of the client, thereby facilitating the direct connection between the host ULP and the ULP FW. As a result acceleration of TCP/IP processing is achieved. Similarly, in response to receiving the ACK signal at the L5NIC of the server, the sequence of notification and connection occurs. As a result there is a direct link between the server ULP and its respective L5NIC ULP FW, resulting in an acceleration of the TCP/IP processing.

Figure 8:
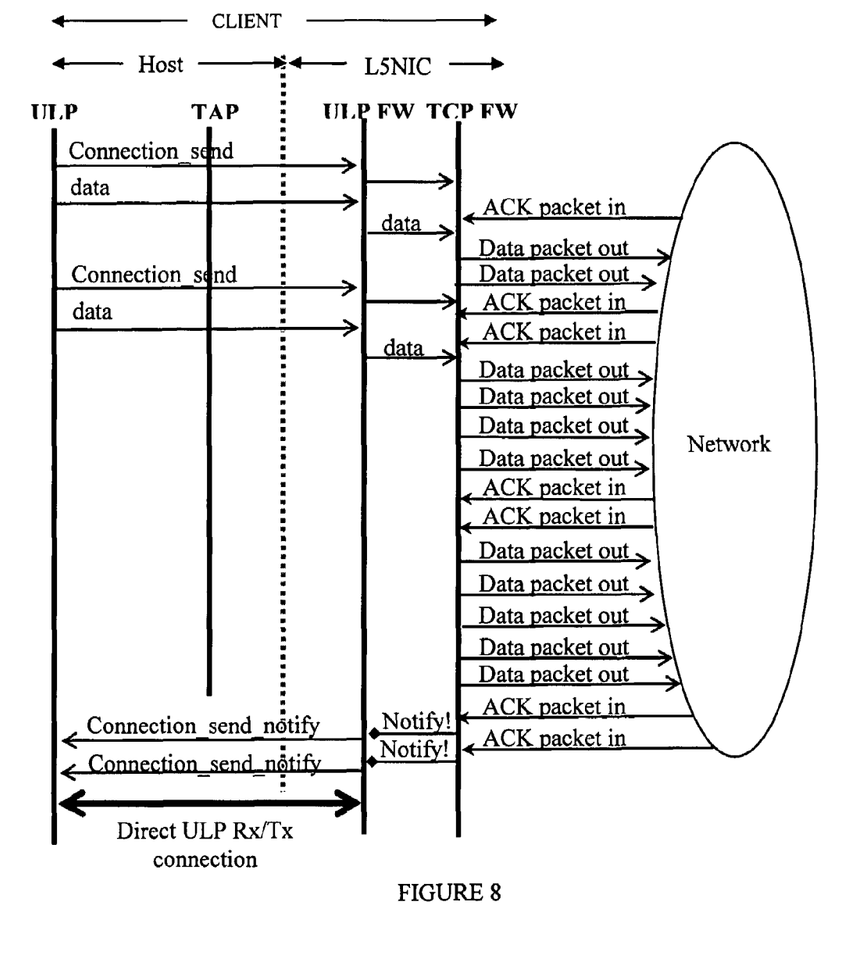
FIG. 8 is a diagram of an exemplary implementation of data transmission embodying aspects of the disclosed teachings.

Reference is now made to FIG. 8 where a communication diagram showing the data transfer after a connection is available, from the perspective of the client or server, is shown. Specifically, the capability of an example implementation of an apparatus embodying aspects of the disclosed teachings to operate directly from the ULP to the ULP handler of an L5NIC is depicted. It should be noted that this diagram is applicable at a time after a connection was established as was described in FIG. 7 above. Specifically the host may generate a connection_send request aiming at the sending of data to, for example, a server, via the network. The data is also sent to the L5NIC as a data block and it is the responsibility of the L5NIC to handle splitting the data into packets. Packets of data are sent out and acknowledgments of packets received by the remote location are received without any further intervention by the host. All such activity is handled by the L5NIC without intervention by the host. Upon receiving acknowledgment of the last packet being received by the remote location, a notification is sent to the ULP FW of the L5NIC, which in return sends a connection_send_notify message to the host ULP, to confirm that the data was received by the remote location. Therefore it is clear that the host was relieved from the need to handle the data packet send operation resulting in overall performance acceleration of this activity.

Figure 9:
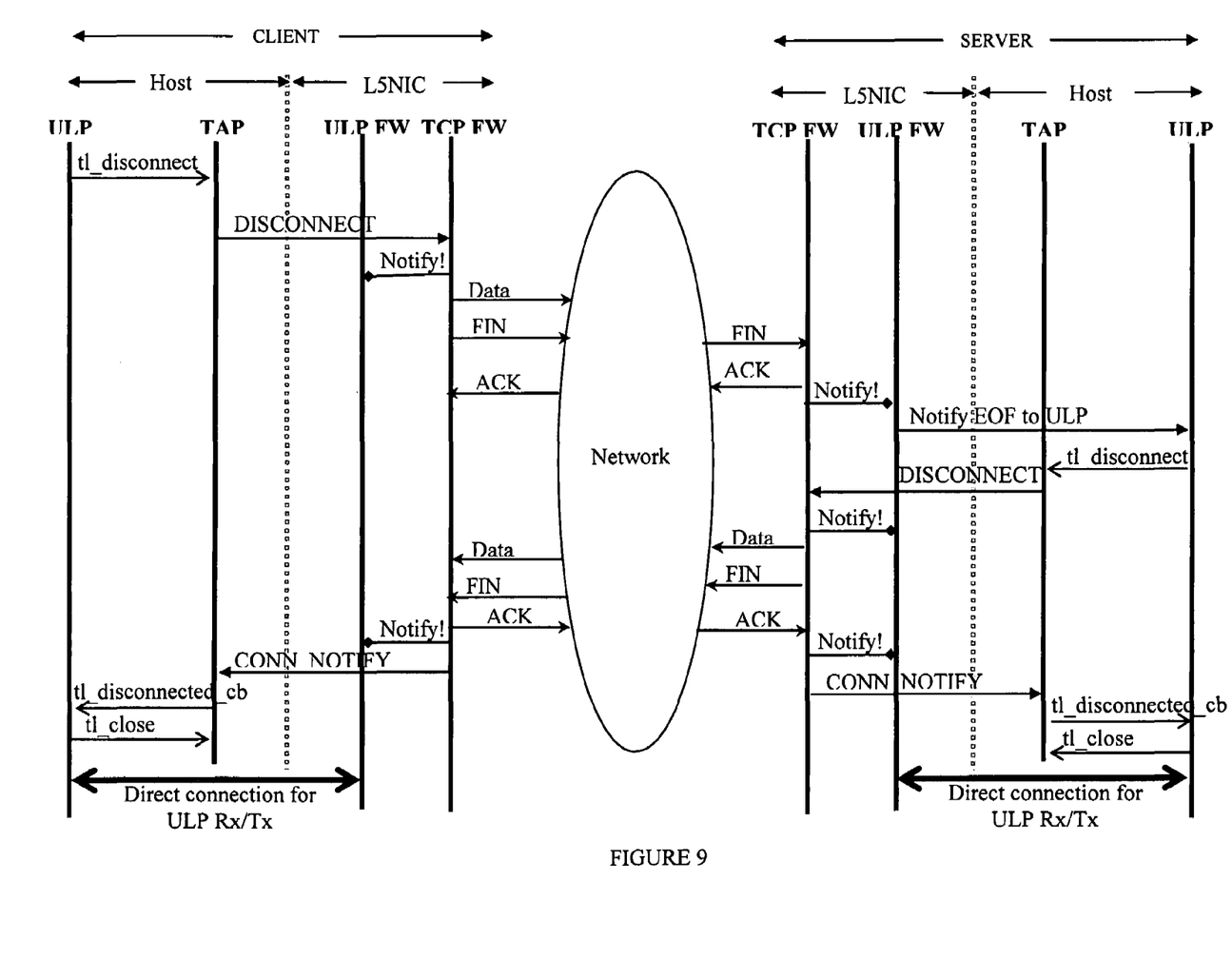
FIG. 9 is a diagram of an exemplary implementation of connection closure in embodying aspects of the disclosed teachings.

Referring to FIG. 9, a communication diagram of a closure of a client to server connection is shown. The host initiates a disconnect by sending the message "tl_disconnect" to the TAP. TAP then sends a "DISCONNECT" message to the TCP FW which responds with a "notify" message to the ULP FW. Any data that needs to be sent is sent over the network followed by a "FIN" signal. The FIN signal is received by the TCP FW of the server's L5NIC which responds with an ACK signal back to the client side, and a "notify" signal to the ULP FW of the server's L5NIC. The ULP FW sends an end of file (EOF) notification to the ULP which responds with a "tl_disconnect" to the TAP. TAP responds with a "DISCONNECT" message to the TCP FW. Any remaining data is sent to the network and received by the client, followed by a "FIN" signal sent from the L5NIC of the server to the network. The "FIN" message is received by the L5NIC of the client side and responds with an "ACK" message to the server, in addition to notification to the ULP FW as well as a "CONN_NOTIFY: to the TAP of the server. TAP responds with a "tl_disconnect_cb to the ULP which concludes with a "tl_close" to the TAP to clean all the resources associated with the connection on the host side. Similarly, upon receipt of an "ACK" message by the L5NIC of the server, a similar sequence of events takes place causing the connection to terminate. This communication model where a L5NIC is implemented on only one of the client or server sides can be implemented. While a closure of connection by a client to a server is described hereinabove, the operation for the closure of a connection initiated by a server to a client is also within the scope of the disclosed teachings.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

The invention claimed is:

1. A network interface card comprising:
an upper layer protocol (ULP) handler;
a TCP handler capable of interfacing with said ULP handler; and,
a link handler,
wherein the ULP handler of the network interface card is adapted to take over and perform at least one session layer function of a host computer connected to a network, said network interface card is capable of receiving commands from an enhanced stack belonging to said host, said enhanced stack being further capable of supporting session layer acceleration, the commands between said enhanced stack and said network interface card are performed using acceleration primitives, and said network interface card is operable to handles only a subset said acceleration primitives sent to said network interface card from a plurality of said acceleration primitives sent to a plurality of network interface card devices.

2. A network interface card comprising:
an upper layer protocol (ULP) handler;
a TCP handler capable of interfacing with said ULP handler; and,
a link handler,
wherein the ULP handler of the network interface card is adapted to take over and perform at least one session layer function of a host computer connected to a network, said network interface card is capable of receiving commands from an enhanced stack belonging to said host, said enhanced stack being further capable of supporting session layer acceleration, the commands between said enhanced stack and said network interface card are performed using acceleration primitives, at least one of said acceleration primitives is used to establish a direct connection between ULP of said host and said ULP handler, said direct connection enables at least one function associated with a TCP/IP layer to be processed on said network interface card, said direct connection enables transferring data to said network interface card from said host and transferring data from said network interface card to said host, and said transferring data to said network interface card includes at least one of a transfer in request, a success transfer in reply and a fail transfer in reply.

3. A network interface card comprising:
an upper layer protocol (ULP) handler;
a TCP handler capable of interfacing with said ULP handler; and,
a link handler,
wherein the ULP handler of the network interface card is adapted to take over and perform at least one session layer function of a host computer connected to a network, said network interface card is capable of receiving commands from an enhanced stack belonging to said host, said enhanced stack being further capable of supporting session layer acceleration, the commands between said enhanced stack and said network interface card are performed using acceleration primitives, at least one of said acceleration primitives is used to establish a direct connection between ULP of said host and said ULP handler, said direct connection enables at least one function associated with a TCP/IP layer to be processed on said network interface card, said direct connection enables transferring data to said network interface card from said host and transferring data from said network interface card to said host, and said transferring data from said network interface card includes at least one of a transfer out request, a success transfer out reply and a fail transfer out reply.

4. A network interface card comprising:
an upper layer protocol (ULP) handler;
a TCP handler capable of interfacing with said ULP handler; and,
a link handler,
wherein the ULP handler of the network interface card is adapted to take over and perform at least one session layer function of a host computer connected to a network, said network interface card is capable of receiving commands from an enhanced stack belonging to said host, said enhanced stack being further capable of supporting session layer acceleration, the commands between said enhanced stack and said network interface card are performed using acceleration primitives, said acceleration primitives are enabled by the use of an application programming interface (API) for interfacing between said host and said network interface card, said API being further comprised of a plurality of acceleration primitives, and at least one of said acceleration primitives is a connection transfer in acceleration primitive sent in order to transfer a connection for acceleration by the network interface card.

5. The network interface card of claim 4, wherein said connection transfer in acceleration primitive further contains at least information required to start a new or continued processing of an existing connection.

6. The network interface card of claim 5, wherein said necessary information comprises at least one of a connection 4tuple, initial sequence number, unacknowledged sequence number, acknowledgement sequence number, current sent time stamp, current received timestamp and remote or local negotiated window scale values.

7. The network interface card of claim 4, wherein said connection transfer in acceleration primitive includes a unique identifier for connection reference, said unique identifier being further recognizable by said network interface card and by said host.

8. The network interface card of claim 4 wherein at least one of said acceleration primitives is a connection transfer out acceleration primitive capable of causing said network interface card to transfer a connection out of said network interface card.

9. The network interface card of claim 8, wherein said connection transfer out acceleration primitive provides only a connection reference to said network interface card.

10. The network interface card of claim 4, wherein at least one of said acceleration primitives is a connection disconnect acceleration primitive, said acceleration primitive being capable of causing said network interface card to gradually close a previously opened connection to said network interface card.

11. The network interface card of claim 10, wherein said connection disconnect acceleration primitive provides only a connection reference to said network interface card.

12. The network interface card of claim 4, wherein at least one of said acceleration primitives is a connection abort acceleration primitive, said acceleration primitive being capable of causing said network interface card to abort a previously opened connection to said network interface card.

13. The network interface card of claim 12, wherein said connection abort acceleration primitive provides only a connection reference to said network interface card.

14. The network interface card of claim 4, wherein at least one of said acceleration primitives is a connection shutdown of transmission acceleration primitive, said acceleration primitive being capable of causing said network interface card to gracefully close a write side of a connection of said NIC.

15. The network interface card of claim 14, wherein said connection shutdown of transmission acceleration primitive provides only a connection reference to said network interface card.

16. The network interface card of claim 4, wherein at least one of said acceleration primitives is a connection send acceleration primitive, said acceleration primitive being capable of causing a transmission of data over an established connection.

17. The network interface card of claim 16, wherein said connection send acceleration primitive is associated with data related to a TCP/IP connection, said data is at least one of connection reference, list of buffers in the host memory and their length, said buffers containing data to be transferred over a connection.

18. The network interface card of claim 4, wherein at least one of said acceleration primitives is a connection receive acceleration primitive, said acceleration primitive being capable of causing a reception of data over an established connection, the date being received by connection specific receive buffers in a host memory.

19. The network interface card of claim 18, wherein said connection receive acceleration primitive is associated with data related to a TCP/IP connection, said date is at least one of connection reference, list of connection specific buffers in the host memory and their length.

20. The network interface card of claim 4, wherein at least one of said acceleration primitives is a connection synchronization acceleration primitive, said acceleration primitive being capable of flushing existing message pipes between the host and said network interface card.

21. The network interface card of claim 20, wherein said connection synchronization acceleration primitive further includes a connection reference.

22. The network interface card of claim 20, wherein a connection synchronization reply acceleration primitive is sent in response to said connection synchronization acceleration primitive.

23. The network interface card of claim 22, wherein said connection synchronization reply acceleration primitive further includes a connection reference.

24. The network interface card of claim 4, wherein said network interface card is capable of sending a connection send notify acceleration primitive, wherein said connection send notify acceleration primitive notifies of a successful transfer of an amount of data related to an offloaded TCP connection.

25. The network interface card of claim 24, wherein data associated with said connection send notify acceleration primitive includes at least one of a connection reference and amount of data successfully transferred over the connection.

26. The network interface card of claim 4, wherein at least one of said acceleration primitives is a connection receive notify acceleration primitive, said acceleration primitive being capable of notifying of the reception of additional data by said network interface card over a connection.

27. The network interface card of claim 26, wherein said additional data may be directed to one of an anonymous host buffer and a connection specific host buffer.

28. The network interface card of claim 27, wherein at least one of said acceleration primitives is a asynchronous buffer acceleration primitive, said acceleration primitive being capable of posting said anonymous receive buffers to said network interface card.

29. The network interface card of claim 28, wherein said anonymous receive buffers are used for a received TCP data and a layer 2 data.

30. The network interface card of claim 28, wherein data associated with said asynchronous buffer acceleration primitive includes a list of buffers in host memory and buffer lengths.

31. The network interface card of claim 26, wherein data associated with said connection receive notify acceleration primitive includes connection reference, buffer identification and amount of data posted into the buffer.

32. The network interface card of claim 4, wherein said network interface card is capable of providing a notification from said network interface card to the host with an indication of a change in connection state.

33. The network interface card of claim 32, wherein the data associated with said notification includes connection reference, notification type and a connection state.

34. The network interface card of claim 33, wherein said notification type include connection established, connection disconnected, connection timed-out and connection gracefully closed.

35. A method for acceleration of a session layer network operation, said method comprising:
  a) sending a sequence of initialization commands from a ULP driver of a host to transport accelerator provider (TAP) of said host;
  b) sending a transfer message from said TAP to a TCP handler of a network interface card (NIC);
  c) sending from said NIC a synchronization command to a server over a network connecting said host computer and said server;
  d) receiving by said NIC a synchronization acknowledgement message over said network from said server;
  e) sending from said NIC an acknowledgment message to said server;
  f) sending a notification command to a ULP handler of said NIC;
  g) sending from said NIC a connection notification command to said TAP of said host; and,
  h) sending a connected information command to said ULP driver of said host.

36. The method of claim 35, wherein said method further comprises using an application programming interface (API) for interfacing between said host and said L5NIC, said API being further comprised of a plurality of acceleration primitives.

37. The method of claim 36, wherein at least one of said acceleration primitives is a connection transfer in acceleration primitive sent in order to transfer a connection for acceleration by the network interface card.

38. The method of claim 37, wherein said connection transfer in acceleration primitive further contains at least information required to start a new or continued processing of an existing connection.

39. The method of claim 38, wherein said necessary information comprises at least one of a connection 4tuple, initial sequence number, unacknowledged sequence number, acknowledgement sequence number, current sent time stamp, current received timestamp and remote or local negotiated window scale values.

40. The method of claim 37, wherein said connection transfer in acceleration primitive includes a unique identifier for connection reference, said unique identifier being further recognizable by said network interface card and by said host.

41. The method of claim 36, wherein at least one of said acceleration primitives is a connection transfer out acceleration primitive capable of causing said network interface card to transfer a connection out of said network interface card.

42. The method of claim 41, wherein said connection transfer out acceleration primitive provides only a connection reference to said network interface card.

43. The method of claim 36, wherein at least one of said acceleration primitives is a connection disconnect acceleration primitive, said acceleration primitive being capable of causing said network interface card to gradually close a previously opened connection to said network interface card.

44. The method of claim 43, wherein said connection disconnect acceleration primitive provides only a connection reference to said network interface card.

45. The method of claim 36, wherein at least one of said acceleration primitives is a connection abort acceleration primitive, said acceleration primitive being capable of causing said network interface card to abort a previously opened connection to said network interface card.

46. The method of claim 45, wherein said connection abort acceleration primitive provides only a connection reference to said network interface card.

47. The method of claim 36, wherein at least one of said acceleration primitives is a connection shutdown of transmission acceleration primitive, said acceleration primitive being capable of causing said network interface card to gracefully close a write side of a connection of said NIC.

48. The method of claim 47, wherein said connection shutdown of transmission acceleration primitive provides only a connection reference to said network interface card.

49. The method of claim 36, wherein at least one of said acceleration primitives is a connection send acceleration primitive, said acceleration primitive being capable of causing a transmission of data over an established connection.

50. The method of claim 49, wherein said connection send acceleration primitive is associated with data related to a TCP/IP connection, said data is at least one of connection reference, list of buffers in the host memory and their length, said buffers containing data to be transferred over a connection.

51. The method of claim 36, wherein at least one of said acceleration primitives is a connection receive acceleration primitive, said acceleration primitive being capable of causing a reception of data over an established connection, the date being received by connection specific receive buffers in a host memory.

52. The method of claim 51, wherein said connection receive acceleration primitive is associated with data related to a TCP/IP connection, said date is at least one of connection reference, list of connection specific buffers in the host memory and their length.

53. The method of claim 36, wherein at least one of said acceleration primitives is a connection synchronization acceleration primitive, said acceleration primitive being capable of flushing existing message pipes between the host and said network interface card.

54. The method of claim 53, wherein said connection synchronization acceleration primitive further includes a connection reference.

55. The method of claim 53, wherein a connection synchronization reply acceleration primitive is sent in response to said connection synchronization acceleration primitive.

56. The method of claim 55, wherein said connection synchronization reply acceleration primitive further includes a connection reference.

57. The method of claim 36, wherein said network interface card is capable of sending a connection send notify acceleration primitive, wherein said connection send notify acceleration primitive notifies of a successful transfer of an amount of data related to an offloaded TCP connection.

58. The method of claim 57, wherein data associated with said connection send notify acceleration primitive includes at least one of a connection reference and amount of data successfully transferred over the connection.

59. The method of claim 36, wherein at least one of said acceleration primitives is a connection receive notify acceleration primitive, said acceleration primitive being capable of notifying of the reception of additional data by said network interface card over a connection.

60. The method of claim 59, wherein said additional data may be directed to one of an anonymous host buffer and a connection specific host buffer.

61. The method of claim 60, wherein at least one of said acceleration primitives is a asynchronous buffer acceleration primitive, said acceleration primitive being capable of posting said anonymous receive buffers to said network interface card.

62. The method of claim 61, wherein said anonymous receive buffers are used for a received TCP data and a layer 2 data.

63. The method of claim 61, wherein data associated with said asynchronous buffer acceleration primitive includes a list of buffers in host memory and buffer lengths.

64. The method of claim 59, wherein data associated with said connection receive notify acceleration primitive includes connection reference, buffer identification and amount of data posted into the buffer.

65. The method of claim 36, wherein said network interface card is capable of providing a notification from said network interface card to the host with an indication of a change in connection state.

66. The method of claim 65, wherein the data associated with said notification includes connection reference, notification type and a connection state.

67. The method of claim 66, wherein said notification type include connection established, connection disconnected, connection timed-out and connection gracefully closed.

68. The method of claim 35, wherein the network interface card corresponds to a layer 5 of a seven layer OSI network architecture.

* * * * *